(12) United States Patent
Yin et al.

(10) Patent No.: US 9,091,043 B2
(45) Date of Patent: Jul. 28, 2015

(54) FORWARD EIGHT-BAR LINKAGE WORKING DEVICE FOR LOADING END OF A BACKHOE LOADER

(75) Inventors: Liu Yin, Jiangsu (CN); Shen Shuo, Jiangsu (CN); Lan Qiang, Jiangsu (CN)

(73) Assignee: Jiangsu Liugong Machinery Co. Ltd., Jiangsu (CN)

( * ) Notice: Subject to any disclaimer, the term of this patent is extended or adjusted under 35 U.S.C. 154(b) by 0 days.

(21) Appl. No.: 14/367,189

(22) PCT Filed: Jul. 3, 2012

(86) PCT No.: PCT/CN2012/078084
§ 371 (c)(1),
(2), (4) Date: Jun. 19, 2014

(87) PCT Pub. No.: WO2013/102343
PCT Pub. Date: Jul. 11, 2013

(65) Prior Publication Data
US 2014/0341689 A1      Nov. 20, 2014

(30) Foreign Application Priority Data
Jan. 4, 2012    (CN) .......................... 2012 1 0000839

(51) Int. Cl.
  *E02F 3/34*    (2006.01)
  *E02F 3/38*    (2006.01)
  *F16H 21/54*   (2006.01)

(52) U.S. Cl.
  CPC ................. *E02F 3/34* (2013.01); *E02F 3/3408* (2013.01); *E02F 3/3411* (2013.01); *E02F 3/38* (2013.01); *F16H 21/54* (2013.01)

(58) Field of Classification Search
  CPC ........... E02F 3/433; E02F 3/432; E02F 3/342; E02F 9/0841
  USPC .......................... 414/680, 685, 697, 700, 701
  See application file for complete search history.

(56) References Cited

FOREIGN PATENT DOCUMENTS

| CN | 2559619  | 7/2003  |
|----|----------|---------|
| CN | 201687020 | 12/2010 |
| CN | 102518155 | 6/2012  |
| GB | 2353270  | 2/2001  |
| JP | H09217375 | 8/1997  |

OTHER PUBLICATIONS

International Search Report of PCT/CN2012/078084 dated Nov. 1, 2012, 6 pages (w/ English translation).

*Primary Examiner* — Saul Rodriguez
*Assistant Examiner* — Emery Hassan
(74) *Attorney, Agent, or Firm* — Rankin, Hill & Clark LLP

(57) ABSTRACT

A forward eight-bar linkage working device for the loading end of a backhoe loader comprises a front frame, a movable boom, a rotatable bucket oil cylinder, a movable boom oil cylinder, a rotatable bucket lever, a rotatable bucket pull link, a movable boom pull rod, a movable boom lever and a bucket; and the forward eight-bar linkage mechanism enables a working device of the loading end to achieve a larger breakout force in the case of the same engine power, and makes the axle load distribution ratio of the machine more reasonable, enhancing the operation efficiency and the operation balance.

4 Claims, 2 Drawing Sheets

FORWARD EIGHT-BAR LINKAGE WORKING DEVICE FOR LOADING END OF A BACKHOE LOADER

TECHNICAL FIELD

This invention relates to a working device for a backhoe loader, and in particular, to a forward eight-bar linkage working device for the loading end of a backhoe loader, which belongs to the technical field of engineering machinery.

BACKGROUND OF THE INVENTION

The front and rear ends of a backhoe loader are a loading end and a digging end respectively, such that one and the same machine can implement loading and digging functions, and therefore, a backhoe loader is commonly known as "backhoe loader".

The current backhoe loader generally employs a forward eight-bar linkage or forward six-bar linkage mechanism in order to enhance the lifting performance of the loading end, and taking the lifting balance of the loading end into overall account, the forward eight-bar linkage structure would be chosen by most of manufacturers. In general, a forward eight-bar linkage structure has eleven hinge points; and a rotatable bucket oil cylinder, a rotatable bucket lever and a rotatable bucket pull link are hinged at one and the same point together, but such working device where the three bars are hinged at one and the same point has a relatively small breakout force in the case of equal engine power. The dimension, scale and the hinge point position of each bar of a working device of the forward eight-bar linkage structure are different from one another, thus resulting in different dumping height, dumping distance and breakout force.

SUMMARY OF THE INVENTION

The object of the invention: in order to optimize the performance of a working device of the digging end of a backhoe loader, achieve a reasonable dumping height and dumping distance, and achieve a larger breakout force of the loading end in the case of the same engine output power. This invention provides a forward eight-bar linkage working device for the loading end of a backhoe loader, which has twelve hinge points designed optimally and better loading performance.

The technical solution: a forward eight-bar linkage working device for the loading end of a backhoe loader comprises a front frame, a movable boom, a rotatable bucket oil cylinder, a movable boom oil cylinder, a rotatable bucket lever, a rotatable bucket pull link, a movable boom pull rod, a movable boom lever and a bucket; said frame is hinged with one end of the movable boom at a point A, hinged with one end of the movable boom pull rod at a point C and hinged with one end of the movable boom oil cylinder at a point E respectively, the other end of said movable boom is hinged with the bucket at a point B, the other end of said movable boom pull rod is hinged with one end of the movable boom lever at a point D, and the other end of said movable boom oil cylinder is hinged at a point F in the middle of the movable boom; the middle of said movable boom lever is hinged with the movable boom at a point G which is located between the two points A and F; the other end of said movable boom lever is hinged with one end of the rotatable bucket oil cylinder at a point H, the other end of the rotatable bucket oil cylinder is hinged with one end of the rotatable bucket lever at a point I, and the other end of the rotatable bucket lever is hinged with the bucket at a point J; both ends of said rotatable bucket pull link are hinged with the rotatable bucket lever and the movable boom at points K and L respectively, said point K being located between the points I and J, and said point L being located between the points F and B; and the positional relationship among the points of said forward eight-bar linkage mechanism is as follows: taking a reference length as 1, IK=1, 0.9<AC<1.2, 3.4<AG<3.8, 2<GH<2.4, 6.2<GL<6.8, 2.2<KL<2.5, 2.8<KJ<3.2, 1.6<BJ<1.9, 2.2<BL<2.6, 1.2<DG<1.5, the HI extension length between 5.04 and 9.3, and the EF extension length between 5.03 and 8.9. In this case, AC=1.03, AG=3.6, GH=2.24, GL=6.52, KL=2.35, KJ=2.93, BJ=1.75, BL=2.43, and DG=1.31.

The connecting lines among each hinge point are simplified into an eight-bar linkage mechanism: a first bar AB being composed of the connecting line between the hinge points A and B on the front frame, a second bar CD being composed of the connecting line between the hinge points C and D at both ends of the movable boom pull rod, a third bar EF being composed of the connecting line between the two hinge points E and F on the movable boom oil cylinder, a fourth bar DH being composed of the connecting line between the hinge points D and H at both ends of the boom rocker, a fifth bar HI being composed of the connecting line between the hinge points H and I at both ends of the rotatable bucket oil cylinder, a sixth bar IJ being composed of the connecting line between the hinge points I and J at both ends of the rotatable bucket lever, a seventh bar KL being composed of the connecting line between the hinge points K and L at both ends of the rotatable bucket pull link, an eighth bar BJ being composed of the connecting line between the two hinge points B and J on the bucket, and the first bar to the eighth bar composing a forward eight-bar linkage mechanism. The sixth bar IJ forms a lever principle with the point K as a fulcrum, increasing the breakout force of this working device.

In order to enhance the working stability of the sixth bar IJ, said rotatable bucket pull link is of a double plate structure which is located at the inner and outer sides of the boom and the rotatable bucket lever respectively.

The beneficial effect is that this forward eight-bar linkage mechanism enables a working device of the loading end to achieve a larger breakout force in the case of the same engine power, and makes the axle load distribution ratio of the complete machine more reasonable, enhancing the operation efficiency and the operation balance.

PARTICULAR EMBODIMENTS

Figure 1:
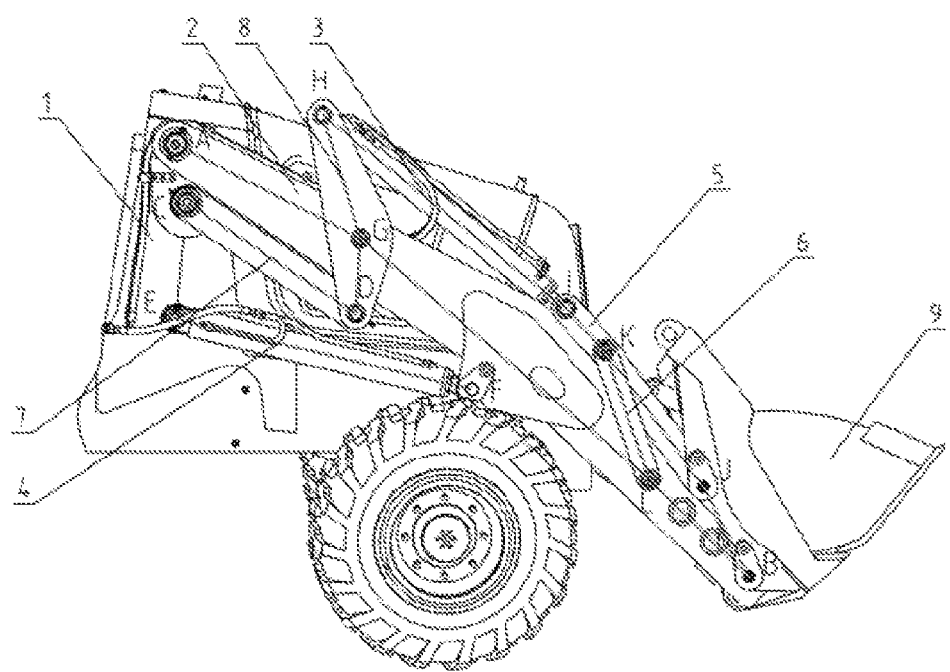
FIG. 1 is a structural representation of this invention with the piston rods of the movable boom oil cylinder and the rotatable bucket oil cylinder being in a retracted position.
Figure 2:
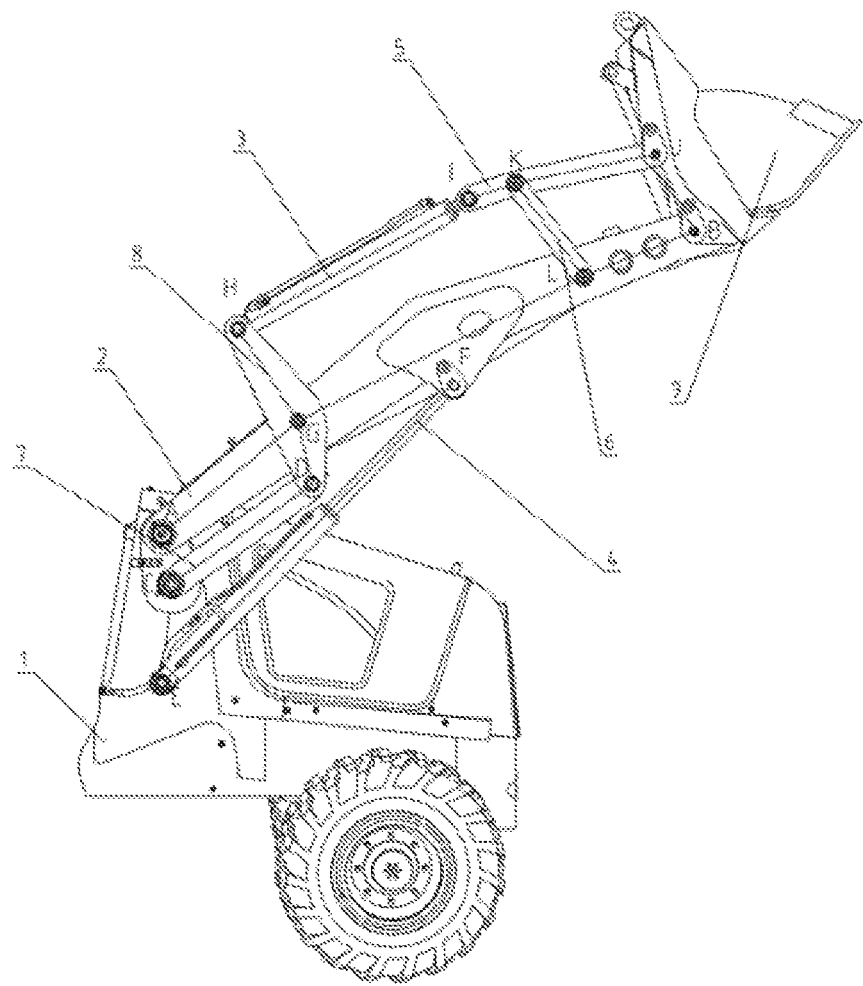
FIG. 2 is a structural representation of this invention with the piston rods of the movable boom oil cylinder and the rotatable bucket oil cylinder being in an extended position.

This invention will be described further hereinafter with reference to the drawings and embodiments. As shown in the figures, a forward eight-bar linkage working device for the loading end of a backhoe loader comprises a front frame 1, a movable boom 2, a rotatable bucket oil cylinder 3, a movable boom oil cylinder 4, a rotatable bucket lever 5, a rotatable bucket pull link 6, a movable boom pull rod 7, a movable boom lever 8 and a bucket 9, characterized in that said frame 1 is hinged with one end of the movable boom 2 at a point A, hinged with one end of the movable boom pull rod 7 at a point C and hinged with one end of the movable boom oil cylinder 4 at a point E respectively, the other end of said movable boom 2 is hinged with the bucket 9 at a point B, the other end of said movable boom pull rod 7 is hinged with one end of the movable boom lever 8 at a point D, and the other end of said movable boom oil cylinder 4 is hinged at a point F in the middle of the boom 2; the middle of said movable boom lever 8 is hinged with the movable boom 2 at a point G which is located between the two points A and F; the other end of said movable boom lever 8 is hinged with one end of the rotatable bucket oil cylinder 3 at a point H, the other end of the rotatable bucket oil cylinder 3 is hinged with one end of the rotatable bucket lever 5 at a point I, and the other end of the rotatable bucket lever 5 is hinged with the bucket 9 at a point J; both ends of said rotatable bucket pull link 6 are hinged with the rotatable bucket lever 5 and the movable boom 2 at points K and L respectively, said point K being located between the points I and J, and said point L being located between the points F and B; said rotatable bucket pull link 6 is of a double plate structure which is located at the inner and outer sides of the boom 2 and the rotatable bucket lever 5 respectively; and the connecting lines among each hinge point are simplified into an eight-bar linkage mechanism: a first bar AB being composed of the connecting line between the hinge points A and B on the front frame 1, a second bar CD being composed of the connecting line between the hinge points C and D at both ends of the movable boom pull rod 7, a third bar EF being composed of the connecting line between the two hinge points E and F on the movable boom oil cylinder 4, a fourth bar DH being composed of the connecting line between the hinge points D and H at both ends of the movable boom lever 8, a fifth bar HI being composed of the connecting line between the hinge points H and I at both ends of the rotatable bucket oil cylinder 3, a sixth bar IJ being composed of the connecting line between the hinge points I and J at both ends of the rotatable bucket lever 5, a seventh bar KL being composed of the connecting line between the hinge points K and L at both ends of the rotatable bucket pull link 6, an eighth bar BJ being composed of the connecting line between the two hinge points B and J on the bucket 9, and the first bar to the eighth bar composing a forward eight-bar linkage mechanism. The sixth bar IJ forms a lever principle with the point K as a fulcrum, increasing the breakout force of this working device.

The positional relationship among the points of said forward eight-bar linkage mechanism is as follows: taking a reference length as 1, IK=1, 0.9<AC<1.2, 3.4<AG<3.8, 2<GH<2.4, 6.2<GL<6.8, 2.2<KL<2.5, 2.8<KJ<3.2, 1.6<BJ<1.9, 2.2<BL<2.6, 1.2<DG<1.5, the HI extension length between 5.04 and 9.3, and the EF extension length between 5.03 and 8.9. Among others, it is the optimum solution that AC=1.03, AG=3.6, GH=2.24, GL=6.52, KL=2.35, KJ=2.93, BJ=1.75, BL=2.43, and DG=1.31.

This forward eight-bar linkage mechanism enables a working device of the loading end to achieve a larger breakout force in the case of the same engine power, and makes the axle load distribution ratio of the complete machine more reasonable, enhancing the operation efficiency and the operation balance.

The invention claimed is:

1. A forward eight-bar linkage working device for the loading end of a backhoe loader, comprising a front frame, a movable boom, a rotatable bucket oil cylinder, a movable boom oil cylinder, a rotatable bucket lever, a rotatable bucket pull link, a movable boom pull rod, a movable boom lever and a bucket, wherein said frame is hinged with one end of the boom at a point A, hinged with one end of the movable boom pull rod at a point C and hinged with one end of the movable boom oil cylinder at a point E respectively, the other end of said movable boom is hinged with the bucket at a point B, the other end of said movable boom pull rod is hinged with one end of the movable boom lever at a point D, and the other end of said movable boom oil cylinder is hinged at a point F in the middle of the boom; the middle of said movable boom lever is hinged with the movable boom at a point G which is located between the two points A and F; the other end of said movable boom lever is hinged with one end of the rotatable bucket oil cylinder at a point H, the other end of the rotatable bucket oil cylinder is hinged with one end of the rotatable bucket lever at a point I, and the other end of the rotatable bucket lever is hinged with the bucket at a point J; both ends of said rotatable bucket pull link are hinged with the rotatable bucket lever and the movable boom at points K and L respectively, said point K being located between the points I and J, and said point L being located between the points F and B; and the positional relationship among the points of said forward eight-bar linkage mechanism is as follows: taking a reference length as 1, then IK=1, 0.9<AC<1.2, 3.4<AG<3.8, 2<GH<2.4, 6.2<GL<6.8, 2.2<KL<2.5, 2.8<KJ<3.2, 1.6<BJ<1.9, 2.2<BL<2.6, 1.2<DG<1.5, the HI extension length is between 5.04 and 9.3, and the EF extension length is between 5.03 and 8.9.

2. The forward eight-bar linkage working device for the loading end of a backhoe loader as claimed in claim 1, wherein AC=1.03, AG=3.6, GH=2.24, GL=6.52, KL=2.35, KJ=2.93, BJ=1.75, BL=2.43, and DG=1.31.

3. The forward eight-bar linkage working device for the loading end of a backhoe loader as claimed in claim 2, wherein said rotatable bucket pull link is of a double plate structure which is located at the inner and outer sides of the movable boom and the rotatable bucket lever respectively.

4. The forward eight-bar linkage working device for the loading end of a backhoe loader as claimed in claim 1, wherein said rotatable bucket pull link is of a double plate structure which is located at the inner and outer sides of the movable boom and the rotatable bucket lever respectively.

* * * * *